L. G. BUCKNER.
VACUUM OIL RETAINER.
APPLICATION FILED FEB. 5, 1916.
1,286,930.
Patented Dec. 10, 1918.
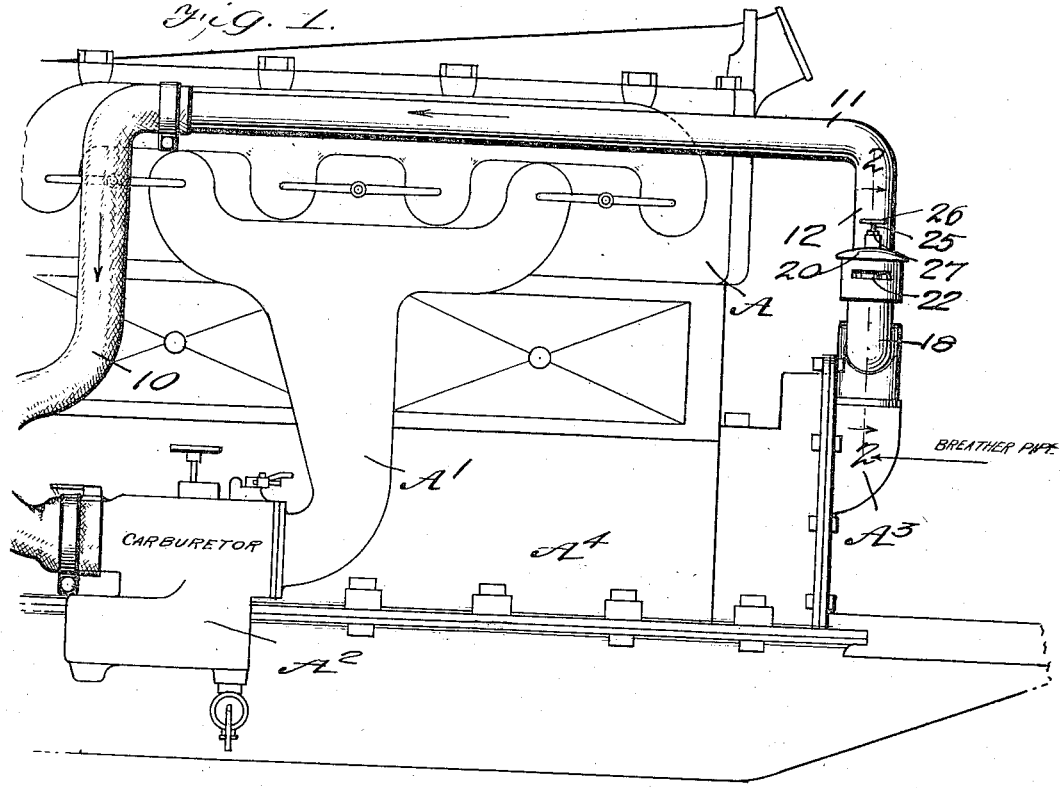
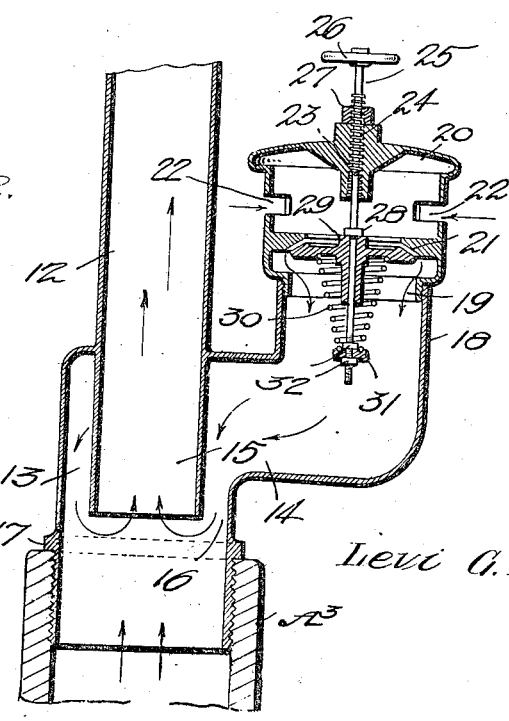
WITNESSES:
INVENTOR
Levi G. Buckner
BY Munn & Co
ATTORNEYS

UNITED STATES PATENT OFFICE.

LEVI G. BUCKNER, OF MEMPHIS, TENNESSEE, ASSIGNOR OF ONE-HALF TO SAMUEL J. SIBLEY, OF MEMPHIS, TENNESSEE.

VACUUM OIL-RETAINER.

1,286,930.  Specification of Letters Patent.  Patented Dec. 10, 1918.

Application filed February 5, 1916. Serial No. 76,482.

*To all whom it may concern:*

Be it known that I, LEVI G. BUCKNER, a citizen of the United States, and a resident of Memphis, in the county of Shelby and State of Tennessee, have invented certain new and useful Improvements in Vacuum Oil-Retainers, of which the following is a specification.

My present invention relates generally to vacuum devices for retaining the oil in the crank case of automobile and other internal combustion engines, and particularly to a novel form of vacuum forming means combined with means for efficiently controlling the vacuum formed so as to render the latter practical and efficient in its use for the purposes, and to the several advantages, which will be hereinafter described.

Referring to the accompanying drawing in which my present improvements are shown, and which forms a part of this specification, Figure 1 is a side view of an automobile engine of well known type, in connection with which my improvements are installed, and Fig. 2 is a detail vertical section, enlarged, and taken on line 2—2 of Fig. 1.

Referring now to these figures, and particularly to Fig. 1, I have shown a "Ford" motor at A, as constituting a well known type of automobile engine, in connection with which my improvements may be applied, the intake manifold being seen at A', the intake leading from the carbureter $A^2$, the intake side of which is connected by a flexible hose connection 10 leading to a pipe 11, the lower end of the forward down-turned vertical portion 12 of which depends within and opens into the lower vertical extension 13 of a fitting 14, it being noted that the inner end portion 15 of pipe 12 is arranged in coaxial relation with the fitting 14 with its wall spaced from the wall of the said vertical portion 14 to form an annular space 16 between these parts.

The lower end of the vertical portion 13 of fitting 14, as particularly shown in Fig. 2, is externally threaded for screw connection within the upper end of the breather pipe $A^3$ at the forward portion of the upper crank case $A^4$, and thus communicates with the interior of the crank case, the said vertical portion 13 also having an annular rib 17 abutting the upper end of the said breather pipe $A^3$.

The upper vertical extension 18, offset with respect to the before mentioned extension 13, of fitting 14, is internally threaded at its upper end to receive the lower externally threaded flange 19 of a cap 20 having an intermediate diaphragm provided with a downwardly facing valve seat 21, and having side openings 22 above said diaphragm through which air finds its way to the interior of the cap.

Through a bearing 23 located centrally of the upper end of the cap 20, the upper threaded portion 24 of a valve stem 25 works, the upper external end of said valve stem having a handle 26 by which the stem may be rotated to effect its longitudinal adjustment in the cap.

Around the threaded portion 24 of the stem, above bearing 23, may be disposed a lock nut 27 to lock the stem in adjusted position, and around the intermediate portion of stem 25 is an annular enlargement 28 constituting the upper limit of sliding movement of a valve 29 slidably disposed upon the lower portion of the said stem and normally held upwardly against the said enlargement by means of a spring 30 coiled around the lower portion of stem 25 and extending between the lower surface of the valve 29 and a disk 31 adjustably supported upon the lower extremity of stem 25 by means of adjusting nuts 32 threaded upon said lower extremity of the stem above and below said disk.

Thus in operation a vacuum is formed within the crank case and maintained at all times by the suction of the carbureter through the pipe 11 and its vertical extension 12, regulated at all times by setting the valve 29 through the connections described, and which may open beyond the set point and against the tension of spring 30 should the pressure increase beyond a desired point.

By thus maintaining a vacuum within the crank case and transmitting to the carbureter products from the crank case mixed with air through valve 29, I contemplate material saving of gasolene, or fuel used, by taking back into the explosion chamber through the carbureter, any gas escaping by the pistons into the crank case, and by the constant and even supply of mixed warm air to the carbureter. This action also tends to increase the efficiency of the motor, and facilitates cranking.

I also contemplate by the same means material reduction of the fire hazard, since there is no accumulation of oil in the motor pan or on the external motor, and in case of back fire all products are turned into the crank case where they can do no harm. I further contemplate the material reduction of the carbon deposits, the annoyance of, and reduction of motor efficiency through, which is well known, by the reduction of the amount of air taken in from the open, since, as has been stated, almost half of the usual carbon deposit results from road dust taken in through the air intake pipe of the usual motor arrangement.

I further contemplate maintaining the bearings in a cooler and better condition, and the lubricating oil at a lower temperature, insuring better lubrication, by virtue of the fact that all hot air and products are being constantly withdrawn from the crank case.

It is understood, of course, that, by the use of means whereby to create and constantly maintain a vacuum in the crank case during operation of the motor, all lubricating oil therein, portions of which are constantly forced out through the bearings in the ordinary construction of motor, side plates, and other parts, by the internal pressure, is retained.

It is further to be understood that, by removing the cap 20 containing valve 29, at its threaded connection 19, provision is made for filtering oil through the fitting 14 into the crank case whenever desirable, and with little trouble or waste of time.

I claim:—

1. The combination with an internal combustion motor including a carbureter and a crank case, of a fitting having offset extensions, one of which is connected to and communicates with the crank case, a cap detachably connected to the other of said extensions and having air admission ports, a manually adjustable spring controlled valve carried by the cap and removable therewith from the said extension of the fitting, and a suction pipe, one end of which extends into the first named extension in spaced coaxial relation and which thus communicates with both the crank case and the said air valve, and the other end of which suction pipe is connected to the intake of the carbureter.

2. The combination with an internal combustion motor including a crank case and a carbureter, of a fitting having offset extensions, one of which is connected to and communicates with the said crank case, a cap detachably connected to the other extension and having air admission ports and a valve seat, a spring controlled manually adjustable valve member on said seat, and a suction pipe, one end of which extends into the first named extension in spaced coaxial relation, and the other end of which is connected to the intake of the carbureter.

3. The combination with an internal combustion motor including a crank case and a carbureter, of a fitting having offset extensions, one of which is connected to and communicates with the crank case, and the other of which constitutes an air intake pipe, a valve controlling the intake of air through said lateral extension, a suction pipe one end of which extends into the first named extension in spaced coaxial relation, and connections between the other end of said suction pipe and the intake side of the carbureter.

4. The combination with an internal combustion motor including a crank case and a carbureter, of a suction pipe forming an unobstructed air passage, one end of which is connected to the intake of the carbureter and the other end of which communicates with the interior of the crank case, and an air intake valve with which the last mentioned end of the suction pipe communicates whereby to control the pressure within the crank case and supply air to the carbureter.

5. The combination with the crank case of an internal combustion motor, of means for establishing a vacuum within said crank case and continuously maintaining the same during operation of the motor, a valve controlling the same, and means for adjusting the valve whereby to maintain the pressure within the crank case at a predetermined point.

6. The combination with the carbureter and crank case of an internal combustion motor, of a connection between the crank case and the carbureter for establishing a vacuum within said crank case and continuously maintaining the same during operation of the motor, said connection forming an unobstructed air passage and having an air intake, and a valve automatically controlling the said air intake to regulate the pressure in said crank case.

7. In a device of the class described, the combination with the carbureter and breathing port of a gas engine, of a tube connecting said breathing port with the intake of said carbureter, and normally forming a direct communication therebetween, and means including a controlling valve in connection with said tube for admitting air from the outside to said carbureter to relieve the suction upon the crank case.

8. In a device of the class described, the combination with the carbureter and breathing port of a gas engine, of a tube connecting said breathing port with the intake of said carbureter, means in connection with said tube for admitting air from the outside to said carbureter, and means for adjusting the quantity of air therethrough.

9. In a device of the class described, the combination of a carbureter, a conductor secured to the intake of said carbureter, and its other end connecting with the breathing port to the crank case of said engine, means for admitting air from the outside to said conductor, and adjustable means for regulating the quantity of air to said conductor.

LEVI G. BUCKNER.